US006571342B1

(12) United States Patent
Detlef

(10) Patent No.: US 6,571,342 B1
(45) Date of Patent: May 27, 2003

(54) PORTABLE COMPUTING DEVICE WITH MULTIPLE OPERATIONAL MODES

(75) Inventor: Michael J. Detlef, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/427,537

(22) Filed: Oct. 26, 1999

(51) Int. Cl.[7] .............................................. G06F 13/00
(52) U.S. Cl. ..................... 713/323; 710/304; 725/42
(58) Field of Search ....................... 320/137; 707/203; 235/375; 713/323; 710/304; 725/42

(56) References Cited

U.S. PATENT DOCUMENTS

| 5,465,038 A | * | 11/1995 | Register ..................... 235/375 |
| 5,666,530 A | * | 9/1997 | Clark et al. .................. 707/201 |
| 5,740,549 A | * | 4/1998 | Reilly et al. .................. 705/14 |
| 5,918,014 A | * | 6/1999 | Robinson ..................... 706/12 |
| 5,979,757 A | * | 11/1999 | Tracy et al. .................. 186/56 |
| 6,091,956 A | * | 7/2000 | Hollenberg .................. 705/14 |
| 6,237,039 B1 | * | 5/2001 | Perlman ..................... 709/237 |
| 6,275,882 B1 | * | 8/2001 | Cheever et al. ............. 455/456 |
| 6,282,082 B1 | * | 8/2001 | Armitage et al. ........... 709/219 |
| 6,363,419 B1 | * | 3/2002 | Martin et al. ............... 710/302 |
| 6,405,049 B2 | * | 6/2002 | Herrod et al. .............. 455/426 |
| 6,438,588 B1 | * | 8/2002 | Crandall ..................... 361/681 |

FOREIGN PATENT DOCUMENTS

JP  11161250 A  *  6/1999  ............ G09G/5/00

OTHER PUBLICATIONS

Honeywell, "S7350B WebPAD—User Guide", Document No. 69–1514–1, Jul. 2002.*
National Semiconductor, "Geode WebPAD SP3GX01", Document No. 800605–004, May 2001.*
Microsoft News Release, "'Mira', Code Name for Windows CE .NET–Based Smart Display Device Technology", Jan. 7, 2002.*
Intel, "Intel PXA250 Smart Display Development Platform", 2002.*
"News from HP: The HP95LX and the Motorola Newsstream Receiver", The HP Palmtop Paper, Fall 1991.*
"Wireless Communications on your HP Palmtop", The HP Palmtop Paper, vol. 5, No. 4, Jul./Aug. 1996.*

* cited by examiner

Primary Examiner—Dennis M. Butler
Assistant Examiner—Albert Wang
(74) Attorney, Agent, or Firm—Chernoff Vilhauer McClung & Stenzel, LLP

(57) ABSTRACT

A method of operating a portable computing device in a first mode uses a rechargeable energy source while transferring data between the portable computing device and a computer network in response to user actions. The portable computing device is operated in a second mode using a non-rechargeable energy source while transferring data between the portable computing device and the computer network free from user actions. The portable computing device automatically changes from the first mode to the second mode in response to engaging the portable computing device with a stand supporting the portable computing device and providing the non-rechargeable source.

31 Claims, 1 Drawing Sheet

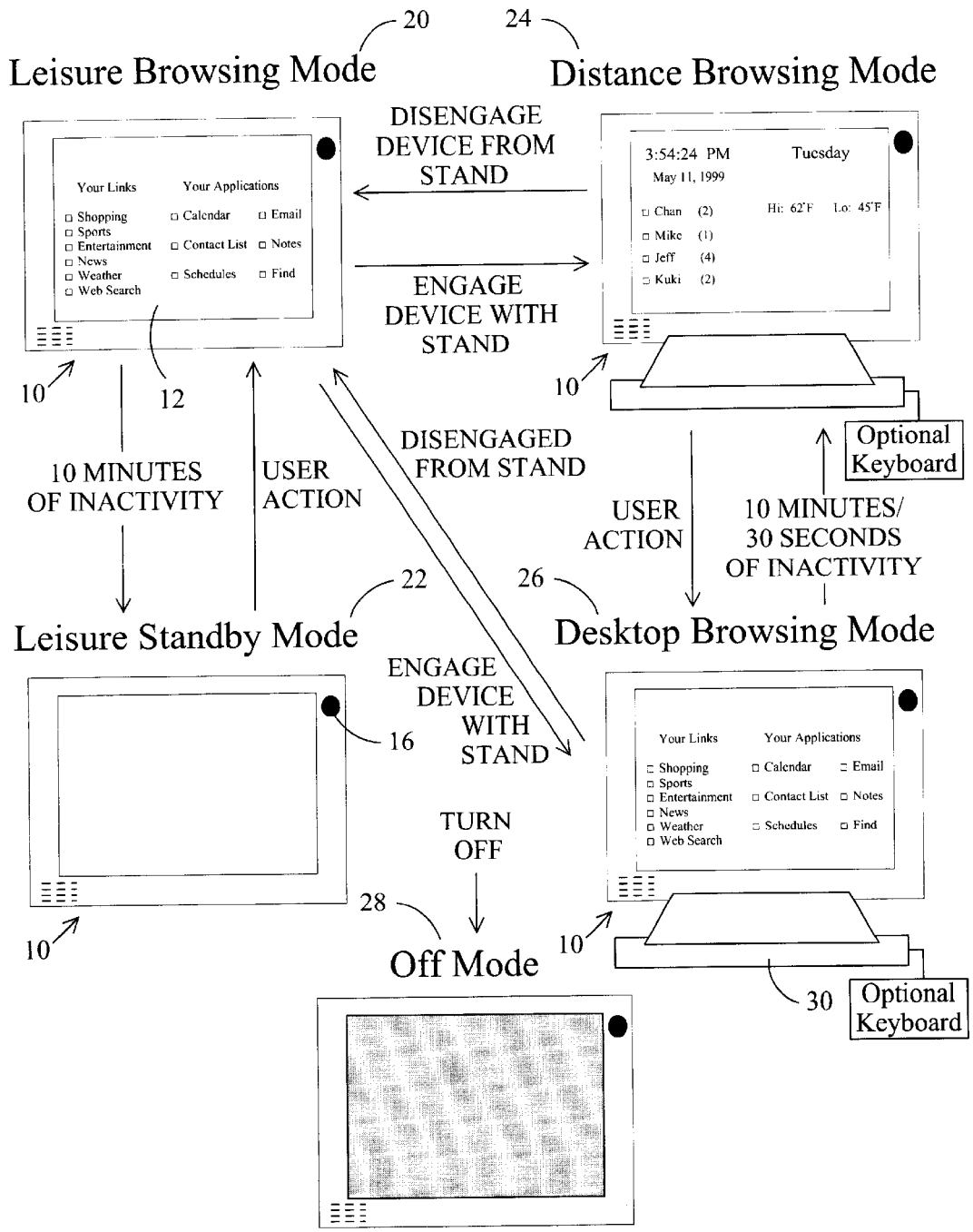
THE FIGURE

PORTABLE COMPUTING DEVICE WITH MULTIPLE OPERATIONAL MODES

BACKGROUND OF THE INVENTION

The present invention relates to a portable computing device with local and distance browsing modes.

Laptop computers are frequently used by placing them on a desktop or the user's lap, and operating computer software, including browsing the Internet for information. In this manner, the information presented to the user is suitable for viewing at an arm lengths distance. The user may conveniently view the information presented thereon and perform the desired tasks. Because most laptop computers are powered by a battery the screen will go blank after an extended period of inactivity in order to extend the use of the battery between charges. In addition, much of the circuitry and devices of the laptop computer, such as the hard drive, will also be de-energized to further reduce power usage, normally referred to as a power saving mode. Normally the power saving mode is deactivated if the user presses a key or otherwise attempts to use the laptop computer.

SUMMARY OF THE INVENTION

The present invention, in a first aspect, provides a method of operating a portable computing device in a first mode using a rechargeable energy source while transferring data between the portable computing device and a computer network in response to user actions. The portable computing device is operated in a second mode using a non-rechargeable energy source while transferring data between the portable computing device and the computer network free from user actions. The portable computing device automatically changes from the first mode to the second mode in response to engaging the portable computing device with a stand supporting the portable computing device and providing the non-rechargeable source.

In a second aspect of the present invention the portable computing device automatically changes from the second mode to the first mode in response to dis-engaging the portable computing device from the stand.

In a third aspect of the present invention the portable computing device operates in a third mode using the non-rechargeable energy source while transferring data between the portable computing device and the computer network in response to user actions. The portable computing device automatically changing from the third mode to the second mode in response to no user action for a predetermined period of time with the portable computing device.

The foregoing and other objectives, features, and advantages of the invention will be more readily understood upon consideration of the following detailed description of the invention, taken in conjunction with the accompanying drawings.

BRIEF DESCRIPTION OF THE DRAWING

The FIGURE is an exemplary illustration of the different browsing modes for the network device of the present invention.

DETAILED DESCRIPTION OF THE PREFERRED EMBODIMENT

Referring to the FIGURE a portable network device 10, such as a web-pad, screen phone, personal data assistant (PDA), laptop, or other computing device includes a display 12 thereon and a power button 16. The network device 10 preferably includes a touch screen display for interactivity with the user. The network device 10 may include any other type of input system, such as for example, a keyboard, a keypad, voice recognition system, a mouse or a pointing device. The network device 10 may include both a power cable connection for relatively "non-mobile" use and batteries for relatively "mobile" use. The network device 10 includes network connectivity computer software such as a browser. The browser may be any type of software, such as for example, Netscape Navigator™ or Internet Explorer™, that permits connectivity for the transfer of data between the network device 10 and a computer network. The computer network may be any type of computer network, such as for example, a local area network, a wide area network, a cellular network, and the Internet.

With a compact form, the network device 10 is suitable for use while on the user's lap. The user may pick up the network device 10, connect to the computer network, and perform the desired task, such as ordering a pizza. This mode of operation is generally referred to herein as a leisure browsing mode 20. Thereafter, the device may be set aside until the user desires to perform another task. After a period of inactivity, such as 10 minutes, the network device 10 automatically enters a power management mode, generally referred to as leisure standby mode 22. The non-essential powered devices, such as the screen, hard drive, speakers, etc., are de-energized to conserve power while the network device is in the leisure standby mode 22. After some action by the user, such as pressing a button on the network device, moving the network device 10, or touching the screen 12, the leisure standby mode 22 is exited and the leisure browsing mode 20 is again activated. Normally when such an action is taken by the user he desires to again use the network device 10 which automatically enters the appropriate mode of operation.

With the combination of the leisure browsing mode 20 and the leisure standby mode 22, with automatic changing between the two modes, the network device 10 is suitable to leave unplugged from a power cable for extended periods of time. Accordingly, the network device 10 is suitable to leave laying on a table or on a desk when not in use and available for any person who may desire to use the network device 10.

A stand 30 may be used to recharge the battery (e.g., a rechargeable energy source) of the network device 10, which includes a powered interconnection to the network device 10 when the network device 10 is engaged therewith. The stand 30 is preferably powered by a cable to a 110 volt electrical outlet (e.g., non-rechargeable energy source). The present inventor came to the realization that if the stand 30 was suitable to support and orient the network device 10 with the display 12 in a generally upright position while being charged, then the same network device 10 that is designed as an interactive browsing device may be used for other non-traditional functions. With the display 12 of the network device 10 in a generally upright position, e.g. not a horizontal position, then the display 12 of the network device 10 may be used to present information to the user. While the network device 10 is in the stand (cradle) it is anticipated that the user is unlikely to engage in interactive browsing activities. When in the distance browsing mode 24 the network device 10 is preferably connected to the computer network so that data may be received from (or transmitted to) the computer network. In this manner, the computer network may "push" data to be presented on the display 12. The information presented on the display while operating in the distance browsing mode 24 may be any suitable type of information, such as for example, the weather, a clock, the temperature, outdoor conditions, advertisements, e-mail arrival, alerts (such as announcements to start a television program), and stock ticker information. In addition, the information may be customized for the particular user or people who are likely to observe the network device 24 while in the distance browsing mode 24. The distance browsing mode 24 may be automatically exited to the leisure browsing mode 20 by simply detaching the network device 10 from the stand 30. In addition, with the combination of the power source being provided when the network device 10 is engaged with the stand 30, the duration of which the distance browsing mode 24 may be active is potentially unlimited.

The combination of the leisure browsing mode 20 and the distance browsing mode 24, together with automatic switching between the two modes, the network device 10 is especially suitable for active network communications by the user and passive display of potentially desirable information while being charged. In this manner, the network device 10 may likewise be used as a source of potential revenue by the presentation of advertisements or other content paid for by the party desiring the information to be presented on the network device 10.

The user may actively use the network device 10 while it is engaged with the stand 30 by some action by the user, such as pressing a button on the network device, moving the network device 10, or touching the screen 12, the distance browsing mode 24 is exited and a desktop browsing mode 26 is activated. Normally when such an action is taken by the user he desires to again use the network device 10 which automatically enters the appropriate mode of operation, namely, the desktop browsing mode 26. The desktop browsing mode 26 permits operation of the network device in a manner similar to the leisure browsing mode 20. After a period of inactivity, such as 10 minutes, the network device 10 automatically enters the distance browsing mode 24. In this manner, after use of the network device 10 it automatically enters a mode suitable for the presentation of information thereon. If the network device 10 is removed from the stand 30 while in the desktop browsing mode 26 it automatically enters the leisure browsing mode 20.

The combination of the desktop browsing mode 26 and the distance browsing mode 24, together with automatic switching between the two modes, the network device 10 is especially suitable for active network communications by the user and passive display of potentially desirable information while being charged. In this manner, the network device 10 may likewise be used as a source of potential revenue by the presentation of advertisements or other content paid for by the party desiring the information to be presented on the network device 10.

The network device 10 may enter an off mode 28 by turning off the power or otherwise turning off the network device 10. It is to be understood that when the network device 10 is not interconnected to the computer network then the distance browsing mode 24 will provide information stored locally. It is also to be understood that the leisure browsing mode 20 and the desktop browsing mode 26 may be any active use of the network device, such as playing games, whether or not the network device 10 is interconnected to the computer network.

In an alternative embodiment, the transition from the leisure browsing mode 20 to the distance browsing mode 24 may be accomplished by engaging the device 10 with the stand 30 to enter the desktop browsing mode 26. Thereafter, a shortened period of inactivity, such as 30 seconds, may be used as a basis for the automatic transition to the distance browsing mode 24. This permits the automatic transition from the leisure browsing mode 20 to the distance browsing mode 24 while still permitting desktop browsing by the user without entering the distance browsing mode 24 if the user interacts with the device 10 in a timely fashion. Preferably, the transition from the desktop browsing mode 26 to the distance browsing mode 24 after just previously being in the distance browsing mode 24 is a longer duration, such as 10 minutes, to permit typical browsing where the user normally has greater periods of inactivity with the device 10. The two different time periods provides suitable transition times to provide a more pleasurable usage of the device 10 by the user. It is to be understood that any time durations may be used, as desired.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of operating a portable computing device comprising:
   (a) operating said portable computing device in a first mode using a rechargeable energy source while transferring data between said portable computing device and a computer network in response to user actions;
   (b) operating said portable computing device in a second mode using a non-rechargeable energy source while transferring data to said portable computing device from said computer network for display on said portable computing device free from user actions; and
   (c) automatically changing from said first mode to said second mode in response to engaging said portable computing device with a stand supporting said portable computing device and providing said non-rechargeable source.

2. The method of claim 1 further comprising automatically changing from said second mode to said first mode in response to disengaging said portable computing device from said stand.

3. The method of claim 2 further comprising automatically changing from said first mode to a third mode power savings mode after a period of inactivity of the user with said portable computing device.

4. The method of claim 3 further comprising automatically changing from said third mode to said first mode in response to user activity with said portable computing device.

5. The method of claim 4 wherein said user activity includes at least one of pressing a button on said portable computing device, moving said portable computing device, and touching a screen attached to said portable computing device.

6. The method of claim 3 wherein said third power savings mode includes at least one of de-energizing a hard drive and de-energizing a screen attached to said portable computing device.

7. The method of claim 4 further comprising automatically changing from said second mode to a fourth mode in response to a user interaction with said portable computing device, wherein said fourth mode includes transferring data between said portable computing device and said computer network in direct response to user actions.

8. The method of claim 7 further comprising automatically changing from said fourth mode to said second mode after a period of inactivity of the user with said portable computing device.

9. The method of claim 1 wherein said transferring data of section (b) includes advertisements.

10. The method of claim 1 wherein said transferring of data of section (a) is using a browser.

11. The method of claim 1 wherein said portable computing device includes a display and said stand supports said display in a generally upright position.

12. A method of operating a portable computing device comprising:
   (a) operating said portable computing device in a first mode using a rechargeable energy source while transferring data between said portable computing device and said computer network in response to user actions;
   (b) operating said portable computing device in a second mode using a non-rechargeable energy source while transferring data to said portable computing device from a computer network for display on said portable computing device free from user actions; and
   (c) automatically changing from said second mode to said first mode in response to dis-engaging said portable computing device from a stand supporting said portable computing device and providing said non-rechargeable source.

13. The method of claim 12 further comprising automatically changing from said first mode to said second mode in response to engaging said portable computing device with said stand supporting said portable computing device and providing said non-rechargeable source.

14. The method of claim 12 further comprising automatically changing from said first mode to a third mode power savings mode after a period of inactivity of the user with said portable computing device.

15. The method of claim 14 further comprising automatically changing from said third mode to said first mode in response to user activity with said portable computing device.

16. The method of claim 15 wherein said user activity includes at least one of pressing a button on said portable computing device, moving said portable computing device, and touching a screen attached to said portable computing device.

17. The method of claim 14 wherein said third power savings mode includes at least one of de-energizing a hard drive and de-energizing a screen attached to said portable computing device.

18. The method of claim 15 further comprising automatically changing from said second mode to a fourth mode in response to a user interaction with said portable computing device, wherein said fourth mode includes transferring data between said portable computing device and said computer network in direct response to user actions.

19. The method of claim 18 further comprising automatically changing from said fourth mode to said second mode after a period of inactivity of the user with said portable computing device.

20. The method of claim 12 wherein said transferring data of section (b) includes advertisements.

21. The method of claim 12 wherein said transferring of data of section (a) is using a browser.

22. The method of claim 12 wherein said portable computing device includes a display and said stand supports said display in a generally upright position.

23. A method of operating a portable computing device comprising:
   (a) operating said portable computing device in a first mode using a non-rechargeable energy source while transferring data to said portable computing device from a computer network for display on said portable computing device in response to user actions;
   (b) operating said portable computing device in a second mode using said non-rechargeable energy source while transferring data to said portable computing device from a computer network for display on said portable computing device free from user actions, wherein said second mode presents data to said user that is unrelated to data presented to said user in said first mode; and
   (c) automatically changing from said first mode to said second mode in response to no user action for a predetermined period of time with said portable computing device.

24. A method of claim 23 further comprising
   (a) operating said portable computing device in a third mode using a rechargeable energy source while transferring data between said portable computing device and said computer network in response to user actions; and
   (b) automatically changing from said second mode to said third mode in response to dis-engaging said portable computing device from a stand supporting said portable computing device and providing said non-rechargeable source.

25. The method of claim 24 further comprising automatically changing from said third mode to said second mode in response to engaging said portable computing device with said stand supporting said portable computing device and providing said non-rechargeable source.

26. The method of claim 25 further comprising automatically changing from said third mode to a fourth mode power savings mode after a period of inactivity of the user with said portable computing device.

27. The method of claim 26 further comprising automatically changing from said fourth mode to said third mode in response to user activity with said portable computing device.

28. The method of claim 27 wherein said user activity includes at least one of pressing a button on said portable computing device, moving said portable computing device, and touching a screen attached to said portable computing device.

29. The method of claim 28 wherein said third power savings mode includes at least one of de-energizing a hard drive and de-energizing a screen attached to said portable computing device.

30. The method of claim 27 further comprising automatically changing from said second mode to said first mode in response to a user interaction with said portable computing device, wherein said first mode includes transferring data between said portable computing device and said computer network in direct response to user actions.

31. The method of claim 30 wherein said portable computing device includes a display and said stand supports said display in a generally upright position.

* * * * *